United States Patent [19]

Amberg et al.

[11] 4,197,948
[45] Apr. 15, 1980

[54] NESTABLE FOAM CUP

[75] Inventors: Stephen W. Amberg, Toledo, Ohio; Thomas E. Doherty, Setauket, N.Y.

[73] Assignee: Owens-Illinois, Inc., Toledo, Ohio

[21] Appl. No.: 683,746

[22] Filed: May 6, 1976

Related U.S. Application Data

[60] Division of Ser. No. 479,421, Jun. 14, 1974, Pat. No. 3,970,492, which is a continuation-in-part of Ser. No. 354,305, Apr. 25, 1973, abandoned, which is a continuation-in-part of Ser. No. 211,259, Dec. 23, 1971, Pat. No. 3,854,583.

[51] Int. Cl.² .................................... B65D 21/02
[52] U.S. Cl. .................. 206/520; 229/1.5 B; 229/48 T
[58] Field of Search ............... 229/1.5 B; 206/519, 206/520

[56] References Cited

U.S. PATENT DOCUMENTS

| 2,969,901 | 1/1961 | Behrens | 229/1.5 B |
|---|---|---|---|
| 3,027,044 | 3/1962 | Winstead | 220/63 R |
| 3,104,045 | 9/1963 | Bruschini | 229/1.5 B |
| 3,322,318 | 5/1967 | Felton | 229/3.5 R |
| 3,363,820 | 1/1968 | Schilling | 229/1.5 B |
| 3,375,954 | 2/1968 | Honkanen | 206/520 |
| 3,468,467 | 9/1969 | Amberg | 229/1.5 B |
| 3,664,568 | 5/1972 | MacDaniel | 229/1.5 B |
| 3,703,255 | 11/1972 | Wade | 229/1.5 B |
| 3,820,684 | 6/1974 | Harrison | 229/1.5 B |
| 3,836,063 | 9/1974 | Sutch | 229/1.5 B |
| 3,931,378 | 1/1976 | Goehring | 229/1.5 B |
| 3,931,380 | 1/1976 | Behuakici | 229/1.5 B |

*Primary Examiner*—George E. Lowrance
*Attorney, Agent, or Firm*—Harold F. Mensing; M. E. Click; D. H. Wilson

[57] ABSTRACT

A fabricated cup or nestable container having a unitary sidewall formed from a double-ended sheet of a heat-shrinkable thermoplastic material, the inner suface of which is adapted to contact a liquid product to be contained in said container. The ends of the sheet are joined to one another forming a liquid-tight seam extending from the top to the bottom of said container. An open mouth at the top is defined by the upper portion of the sidewall. The container sidewall tapers inwardly and downwardly from the open mouth for a major portion of the height of said container. The thickness of the sidewall increases continuously and progressively over this major portion from a lesser thickness at the top thereof to a greater thickness at the bottom thereof. The density of the sidewall continuously and progressively decreases over this major portion from a greater density at the top thereof to a lesser density at the bottom thereof. A separate bottom closure may be joined in a liquid-tight manner to the lower end of the container sidewall to form a two-piece container. Alternately, a bottom closure may be formed from an integral extension of the sidewall by shrinking and sealing the extension to produce a one-piece cup.

10 Claims, 16 Drawing Figures

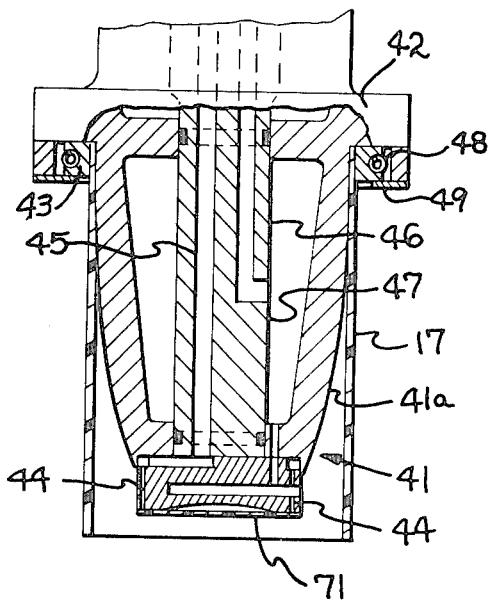
FIG. 6
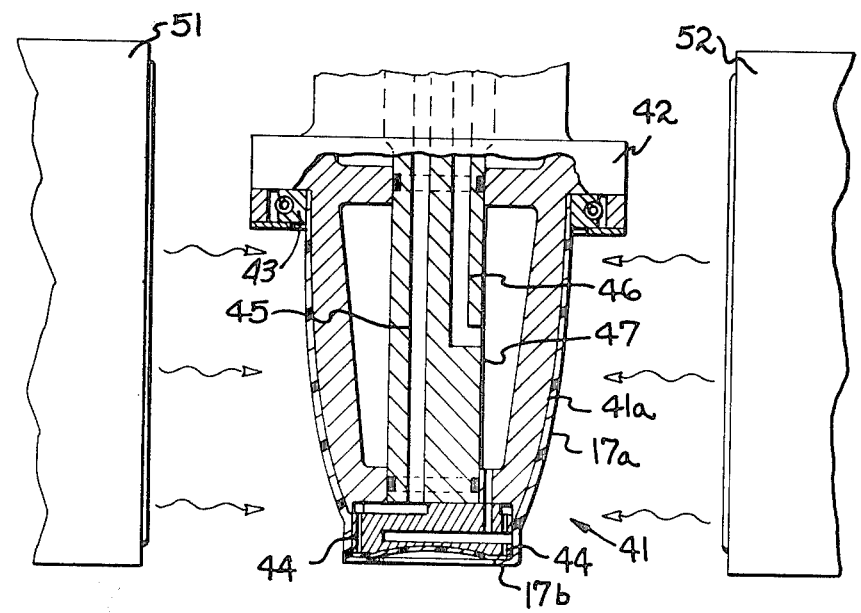
FIG. 7
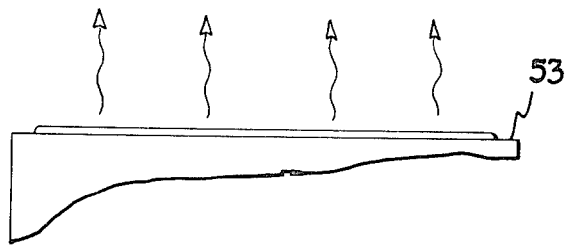

NESTABLE FOAM CUP

CROSS REFERENCE TO RELATED APPLICATION

This application is a division of Ser. No. 479,421, filed June 14, 1974, which issued as U.S. Pat. No. 3,970,492, July 20, 1976; which in turn was a continuation-in-part of Ser. No. 354,305, filed Apr. 25, 1973, now abandoned; which also in turn was a continuation-in-part of Ser. No. 211,259, filed Dec. 23, 1971, and issued as U.S. Pat. No. 3,854,583, Dec. 17, 1974. Another related prior application is Ser. No. 473,998, filed on May 28, 1974, as a continuation of the above-mentioned Ser. No. 211,259 and which issued as U.S. Pat. No. 3,995,740 on Dec. 7, 1976.

BACKGROUND OF THE INVENTION

It has long been recognized that drinking cups and other nestable containers with superior properties, especially for the retention of hot beverages such as coffee, can be formed from expanded thermoplastic materials, the most popular of which has proven to be expanded polystyrene. A very popular cup of this type is a one-piece cup which is molded directly from expandable polystyrene beads in a steam chest. However, in forming cups in this manner, it has proven to be necessary, for purposes of imparting adequate strength, rigidity and liquid impermeability to the sidewall thereof, to construct such cups with a thick sidewall, at least in relationship to the sidewall thickness of other types of insulated cups. As a consequence of this added sidewall thickness, it is not possible to obtain as small a stacking height, or spacing, between like cups in a nested stack thereof, with the result that such cups require considerably more storage space than a comparable quantity of other types of nestable insulating cups. Another disadvantage of the so called steam chest molded cup is that, as an inherent consequence of its mode of manufacture, the external surface of its sidewall can only be decorated by post decorating or printing techniques which are slower and more expensive than the flexographic and other sheet printing techniques which may be used in decorating cups fabricated from pre-printed sheet. As a result, the vast majority of such steam chest molded cups which appear in the market place do not contain a decorated or printed outer surface.

Another known type of insulated or expanded thermoplastic drinking cup which has enjoyed some measure of commercial popularity is a two-piece cup such as that which is manufactured and marketed by the assignee of this application under the trademark "X-Fome" and which corresponds to the cup described in U.S. Pat. No. 3,468,467 which is assigned to the assignee of this application. The sidewall of such cup may be formed by conventional cup fabricating techniques from a crescent-shaped blank of an expanded plastic material which, in turn, is cut from a pre-printed sheet or web of indefinite length thereof. By controlling the density of such sheet, it is possible to fabricate a cup with adequate strength, rigidity and liquid impermeability and which, nonetheless, has a considerably thinner sidewall than a steam chest molded cup for superior stacking or nesting properties in relationship thereto. Also, the ease with which the exterior of the sidewall of such cups can be provided with attractive decoration by pre-decorating the sheet from which the sidewall blanks are formed, has made it possible for a substantial portion of such cups to be decorated in a way which has proven to be quite popular in the trade. One of the drawbacks of such a cup is its costliness, at least insofar as material costs are concerned, in relationship to the steam chest molded cup, due in part to the scrap which is inherently formed when a crescent shaped sidewall blank is cut from a sheet or web of normal character.

Yet another known type of insulated or expanded thermoplastic drinking cup which has also enjoyed some measure of commercial popularity is a one-piece, seamless deep drawn cup which is manufactured and marketed by the assignee of this application and which corresponds to the cup described in U.S. Pat. No. 3,666,162, issued May 30, 1972 (J. R. Tiffin et al). Such cups can, in somewhat higher densities than conventional steam chest molded cups, be formed to very close manufacturing tolerances and with very low stacking height, and because of these features, they have, in spite of somewhat more costliness than the steam chest molded cup and the two-piece cup described above, and in spite of the fact that they can only be decorated after forming, gained a substantial measure of popularity in the coin-operated beverage vending machine market.

SUMMARY OF THE INVENTION

As can be seen from the foregoing discussion, each of known types of insulated cups referred to therein has certain advantages which makes it well-suited for some uses, and certain limitations which makes it less well-suited than one of the other types for other uses. In accordance with the present invention, however, there is provided an insulating cup which combines a wide range of desirable properties, without offsetting limitations, and which is, therefore, well-suited for a wide range of applications for insulated cups. The sidewall of such cup can be formed from rectangular blanks, and therefore without the scrap and inherent expense involved in the severing of crescent-shaped sidewall blanks from a parent sheet or web, and the sidewall of such a cup may be relatively inexpensively provided with attractive, high quality decorative material. Additionally, such cup may be provided with relatively good stacking or nesting characteristics to minimize the required storage space which is important to the carryout beverage industry, which is the bulk user of these types of cups. It is also possible with close manufacturing tolerances, to provide the reliable denesting which is necessary in coin-operated vending machine utilization of cups. Relatively inexpensive high quality cups according to the present invention may readily be formed on a high production basis in either a one-piece version or a two-piece version.

The sidewall of either such version is formed from a web of polystyrene or other thermoplastic polymeric sheet material which has a substantial degree of orientation or heat-shrinkability in the machine direction, by severing rectangular sidewall blanks from such web, preferably after printing or other decorative material is applied to the web by flexographic or similar printing technique in a repeat pattern in registration with the blanks to be cut therefrom, by forming a cylindrical sleeve from each such blank with the machine direction of the parent web extending circumferentially thereof, including the forming of a liquid tight lapped seam between the ends of the sleeve, as by heat sealing, by placing the sleeve over a forming mandrel having an outer forming surface corresponding to the desired configuration of the inner surface of the sidewall of the nestable cup to be formed therefrom, by heating the sleeve while it is so positioned over the mandrel to cause it to heat shrink into conforming face-to-face contact with the forming surface of the mandrel, and by stripping the shrunken sleeve from the mandrel. A separate bottom closure may be affixed to a sidewall formed in this manner either while the sleeve is still in position on the mandrel, or after it is removed, by any of several known cup-manufacturing techniques. Alternatively, a one-piece cup may be formed by starting with a sleeve which is highly oriented in the circumferential direction and which exceeds the height of the forming mandrel over which it is to be telescoped by a distance on the order of one-half of the smaller diameter of such mandrel, with the sleeve being so telescoped over the mandrel that the excess portion of the sleeve extends beyond the smaller end of the mandrel. When such a sleeve is exposed to heat, the excess portion thereof will shrink to form an annular planar portion extending inwardly across the smaller end of the mandrel and a relatively small diameter tubulation extending longitudinally from the interior of such planar portion. By the application of opposed compressive forces to such tubulation while it is at elevated temperature, it can be caused to collapse and to fuse together to close the interior of the annular planar portion in a liquid-tight fashion.

The fabrication of either a two-piece cup or a one-piece cup according to the present invention is effective to provide a cup whose sidewall thickness increases from a lesser thickness at the location of greatest diameter to a greater thickness at a location of lesser diameter. This is especially desirable in that it provides adequate thickness in the lower portion of the cup to protect the hand of a user from the temperature of a hot beverage therein, while keeping the wall thin at the top of the container so that the bead or rim which is normally formed therein need not be excessively thick. This highly advantageous result is accomplished as a direct function of the method of the present invention, since the heat shrinkable sleeve that forms the cup sidewall shrinks to a greater degree adjacent to the bottom of the cup to thereby provide the desired increased thickness at the lower portion of the cup. Also, the degree of taper in the sidewall can readily be increased in the lower thicker regions to offset the adverse effect of a thicker sidewall on the stacking or nesting characteristics of like cups of this type.

The apparatus for fabricating two-piece cups in accordance with the method of the present invention includes a continuously moving main conveyor carrying a plurality of spaced mandrels having an external configuration corresponding to the internal contour of the cup. The main conveyor moves the mandrels along a closed path through a series of operational subassemblies which function in timed sequenced interrelationship to form the cup of the present invention.

The mandrels are preheated to an elevated temperature at a first working station to facilitate shrinkage of sleeve blanks. Individual rectangular blanks are cut from a continous web of heat shrinkable thermoplastic material, formed into a cylindrical sleeve blank and telescoped on to the preheated mandrels. Bottom disc closures are simultaneously cut from two continuous webs of thermoplastic material, and serially delivered to the mandrels on which the sleeves have been positioned.

The mandrels then pass to a heat shrinking station, where the sleeves are heated, as by infra-red radiation, to shrink the sleeves to conform to the external contour of the mandrels and to produce inwardly extending portions at their lower ends that overlap the bottom closure discs. The discs are also, at least partially, formed to the bottom contour of the mandrels by the heat and by the provision of internal vacuum ports in the mandrels which cause the discs to conform to the mandrels bottom surface. The mandrels then pass to a bottom sealing station where the overlapping sleeve portions are fused to the bottom closure discs.

The cups are then removed from the main conveyor to a rimming conveyor and the mandrels commence a new cycle by passing through the preheat subassembly. The removed cups are carried by the rimming conveyor to a rimming mechanism which forms a rim at the lips of the cups and then to an ejection station where the completed cups are removed for packaging.

With the process and apparatus of the present invention, cups having exceptional insulating properties can be fabricated at a relatively low cost. Because the operation of the machine is continuous in nature, it is extremely smooth in operation, and achieves a much higher production rate than has been possible in the past with known apparatus for fabrication of nestable cups.

It is a feature of the present invention to provide a method and apparatus for thermally fabricating the sidewall of such a cup or container from a rectangular blank of an expanded thermoplastic material to impart good insulating properties to such sidewall.

More particularly, it is a feature of the present invention to provide methods and apparatus of producing one-piece and two-piece externally decorated insulated cups with good stacking characteristics and on an economical basis.

BRIEF DESCRIPTION OF THE DRAWINGS

FIGS. 4–8 are schematic views illustrating sequential steps in the fabricating of a two-piece container of the type shown in FIG. 1 from a blank of the type shown in FIG. 3;

DETAILED DESCRIPTION OF THE INVENTION

Figure 1:
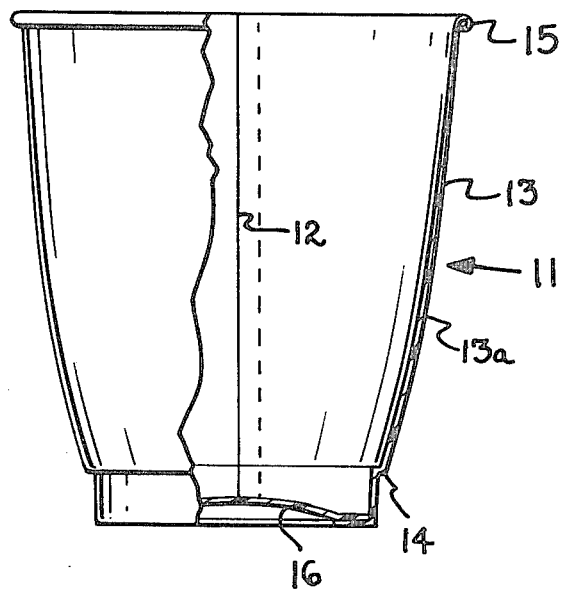
FIG. 1 is an elevational view, partly in section, of a nestable insulated container in accordance with the present invention.

While this invention is susceptible of embodiment in many different forms, there is shown in the drawings and will herein be described in detail only preferred embodiments of exemplary apparatuses and methods for fabricating the same containers in accordance with the present invention and with the understanding that the present disclosure is to be considered as an exemplification of the principles of the invention and is not intended to limit the invention to the specific embodiments illustrated and described. The scope of the invention will be pointed out in the appended claims.

Figure 2:
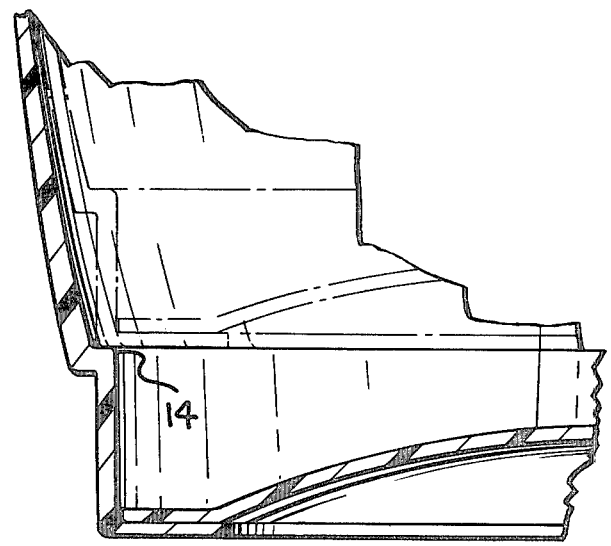
FIG. 2 is a fragmentary sectional view, at an enlarged scale, of a cup in accordance with FIG. 1, showing a like cup in phantom to illustrate the stacking relationship therebetween.

While nestable insulated cups in accordance with the present invention can be constructed in a wide variety of configurations, the presently preferred embodiment of such cup, as is shown generally by reference character 11 in FIGS. 1 and 2, comprises a two-piece cup. Cup 11 is formed, as will be hereinafter described more fully, by heat shrinking an open-ended cylindrical sleeve about a forming mandrel which has an outer forming surface corresponding to the desired contour of the inside surface of the sidewall of the cup, the sleeve having a relatively high degree of orientation in the direction extending circumferentially thereof. Such a sleeve is formed, in accordance with the preferred embodiment of the method and apparatus of the present invention and as will be hereinafter described more fully, by heat sealing or otherwise joining the opposed lapped ends of a rectangular blank of suitable material in a vertically extending liquid tight seam, and as a consequence of such method of forming, cup 11 will have a visible, vertically extending side seam 12 in the sidewall of the cup, which sidewall is identified by reference character 13.

Sidewall 13 of cup 11 has a major uninterrupted portion 13a, shown as extending from the top of the cup to an inwardly extending stacking shoulder 14 which is located near the bottom of the cup, and which is provided to receive the bottom of a like cup inserted therein to provide a positive minimum spacing between nested or stacked cups, as is shown in FIG. 2 and as is well understood in the art. Of course, as is also well understood in the art, equivalent stacking means could be provided in the sidewall of the cup at a relatively higher elevation in the sidewall, in which case the major portion of the sidewall would be located below the stacking means. In either such event, because of the heat shrinking step involved in the manufacture thereof, the thickness of the sidewall of the container decreases as the diameter of the cup increases, and adequate thickness may be provided in the region of the sidewall which is normally grasped by the hand of a user to protect or insulate the hand from the heat of a hot beverage such as coffee. At the same time, it is possible to maintain the thickness in the region of the top of the cup at a low enough value to form a thin tight bead, shown as 15 in FIG. 1, surrounding the mouth of the container. Because close nesting of like cups is adversely affected by increased wall thickness, the major portion 13a of the bottom member is formed from a disc-like element of a thermoplastic material sealable to and compatible with the material of the sidewall, e.g. the same material as the sidewall. This bottom member is joined in a liquid-tight fashion to an inturned portion of the sidewall of the cup, as by heat-sealing or with an adhesive, as hereinafter described. However, it is also contemplated that such bottom member may be formed integrally with the sidewall of the cup, as is also hereinafter described.

Figure 3:
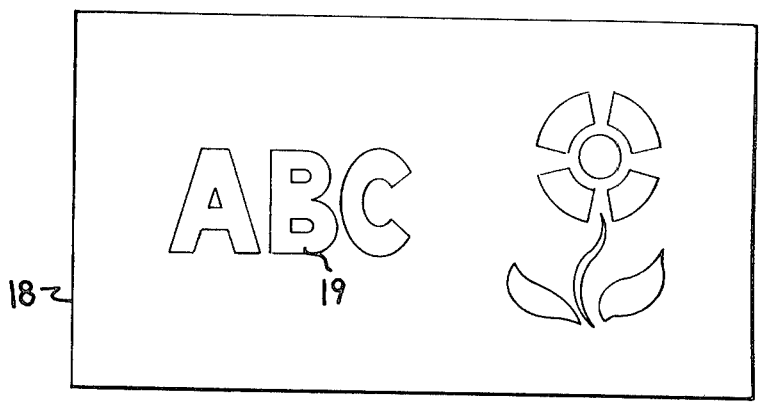
FIG. 3 is a plan view of a rectangular blank from which a cup of the type shown in FIG. 1 can be fabricated.

The sleeve from which a cup of the type shown in FIG. 1 may be formed, which is designated by numeral 17 in FIG. 6, is formed from a rectangular sheet or blank of an expanded plastic material, such as expanded polystyrene, such blank being designated by numeral 18 in FIG. 3. The blank is formed by severing from a parent web or sheet of appropriate material, preferably a web of indefinite length of such material which is highly mono-axially oriented in the longitudinal direction. Such a web may be produced, in turn, by slitting a seamless extruded tube of appropriate thermoplastic material along one or more longitudinally extending lines which, if there are more than one, extend parallel to one another. The requisite orientation in the machine direction may readily be imparted to such web, or webs, by engaging the extruded tube while it is at a suitable orientation temperature between opposed counterrotating rolls which are driven at peripheral speeds substantially in excess of the lineal speed of the thermoplastic material leaving the extruder, all as is well understood in the art.

In practice, it is normally desired that blank 18 be provided with printing or other decorative material on the surface which is destined to be the outer surface of the finished cup. For simplicity, decorative material is shown only in FIG. 3 where it is identified by reference character 19, it being understood that it will also be present in other views of the blank, or of the sleeve or cup which are sequentially formed therefrom.

This decorative material may be rapidly and relatively inexpensively applied, in multiple colors if desired, by applying it in a repeat pattern to the parent web before the individual blanks are severed therefrom, as by means of known printing devices such as a flexographic printing press or an offset rotary letter press, all as is well understood in the art. It is to be noted that, because of the differential contraction of the material involved in shrinking a cylindrical sleeve into the form of the sidewall of a nestable cup, the printing should be applied to the web in a form which is distorted from its desired form, so that upon such differential contraction, the printing will change in form into its desired form.

Figure 4:
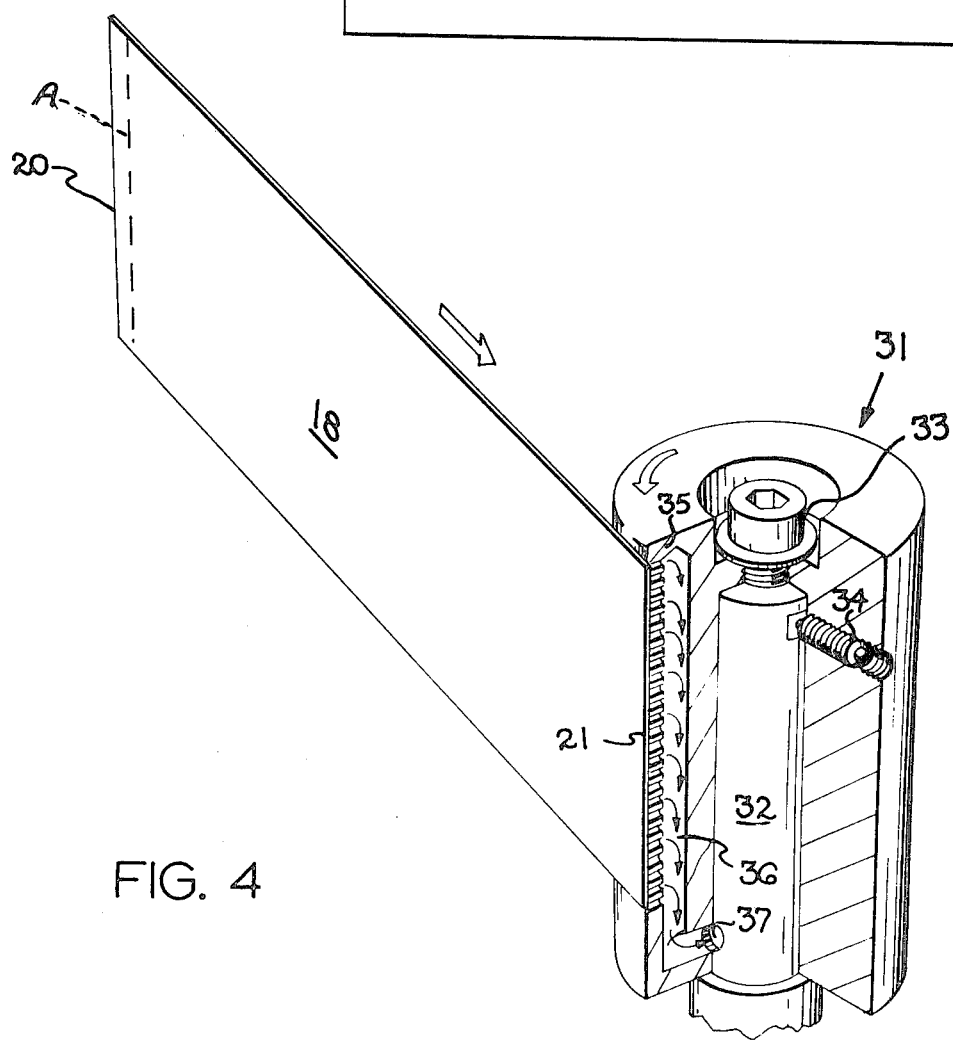
Figure 5:
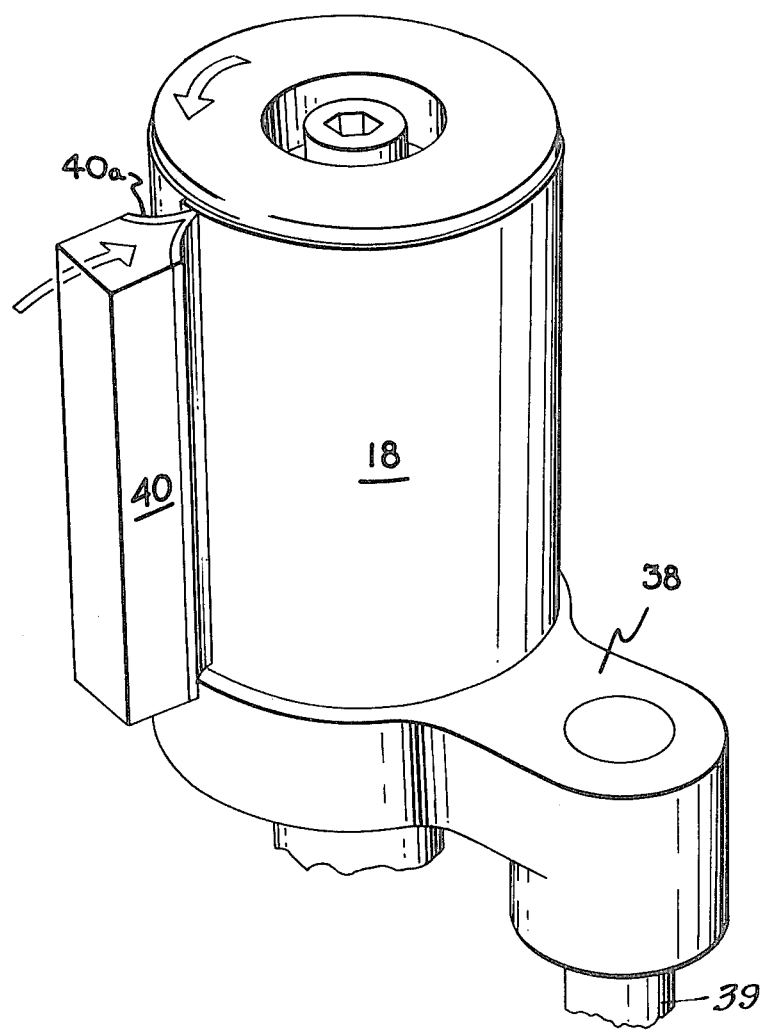

The fabrication of sleeves such as that identified by numeral 17 in FIG. 6 from blanks such as that identified by numeral 18 in FIG. 3 is illustrated in FIGS. 4 and 5. Individual blanks 18 are fed to a rotary mandrel head 31. Mandrel 31 is mounted on shaft 32 and held by collar 33 and set screw 34. Shaft 32 is rotated under power. The blank 18 is held to the mandrel by the vertical row of vacuum ports 35 connected to vertical passage 36 and through radial port 37 into the hollow center passage of shaft 32. The mandrel 31 is concentric with a stripper sleeve 38 carried on a bracket and vertical spindle 39 (FIG. 5). Blank 18 is attached at the leading edge 21 to mandrel 31 by vacuum, and as the mandrel rotates, blank 18 is wrapped around the surface of the cylinder, which is the outer surface of the mandrel 31 to form sleeve 17. The stripper sleeve 38 is in its lowered position out of interference with sleeve 17. The mandrel is the desired size (diameter) in relation to the cup forming mandrel that is to receive the sleeve when finished, as hereinafter described.

As the mandrel 31 completes a revolution, the trailing edge of the blank overlaps the leading edge to form a lap seam for the cylinder. The seam is made by heat and some pressure in bonding the overlapped regions of plastic together, in a liquid-tight seam extending the full height of the sleeve accomplished by bringing heater 40 into contact with these overlapped areas of the sleeve 17. Heater 40 has a surface layer 40a of Teflon material to prevent sticking of the heater nose on the sleeve. Heater 40 is pressed against the overlapped plastic sheet and the combined heat and pressure of heater 40 irons the lap seam into substantially less than the double thickness of the overlap. This forms a feathered edge compatible with the thickness of the remainder of sleeve 17. Heater 40 is on an appropriate carriage to be brought into and out of contact with the sleeve at the proper time and rotation of mandrel 31 during pressure contact of heater 40 as it irons the seam of sleeve 17.

As an alternative, the lap-seam may be made with a hot melt adhesive applied to the inner surface of the blank 18, such as in the area between edge 20 (FIG. 4) and phantom line A. Heater 40 will activate the adhesive area and form an adhesive bond between the overlapped ends of the material on mandrel 31.

To fabricate a two-piece cup from a sleeve 17, produced as has heretofore been described, there is provided a forming mandrel shown generally at 41 in FIG. 6. Mandrel 41 has an exterior surface 41a which is contoured to correspond to the desired contour of the interior surface of the cup 11 which is to be formed therefrom, or at least the sidewall portion, and the mandrel is suspended from a support member 42. A sleeve 17 which is to be formed on mandrel 41 is telescoped thereover with the upper end of sleeve 17 being held in a position aligned with the maximum dimension of forming surface 41a by means of an expansible clamping ring 43. Clamping ring 43 comprises a series of arcuate sleeve contacting segments extending inwardly from an O-shaped spring, and clearance is provided between the clamping ring and the surrounding structure to provide for radial expansion of the ring to accommodate the insertion of the end of a sleeve between the inner ends of such segments and the terminal portion of the forming surface 41a of mandrel 41. Clamping ring 43 is retained in a fixed position relative to the axis of mandrel 41 in a cavity 48 of support member, to the bottom of which is attached a removable flange 49 on which clamping ring 43 slidably rests.

As is shown in FIG. 7, when sleeve 17 is positioned over the forming surface 41a of mandrel 41, the so positioned elements are exposed to a source of heat, as by advancing them in unison into a region, exposed to infra-red heating elements 51, 52 and 53, elements 51 and 52 being directed against opposed sides of mandrel 41 and element 53 being directed against the bottom thereof. For purposes of illustration, elements 51-53 may be considered to be electric elements of the type manufactured by Irex Corporation of Riverdale, N.J. and sold as Radplane radiant process heaters. As an alternative to heating by way of infra-red elements, it is also contemplated that the so positioned sleeve and mandrel could be heated by advancing them through a tunnel through which heated air is circulated. However, infra-red heating has been found to be more controllable and, because of the penetrative effect of the infra-red radiation, somewhat faster than forced convection heating. In any event, the application of heat will cause the portion 17a of sleeve 17 which overlies the side portion of the surface 41a to shrink into tight conforming relationship therewith.

To avoid chilling of the interior surface of the sleeve during shrinking which would, of course, inhibit shrinking, it has been found desirable that the mandrel be at an elevated temperature during the shrinking step, but not at a temperature higher than the softening point of the thermoplastic material from which the sleeve is formed. With sleeves formed from expanded polystyrene, good results have been obtained with a mandrel pre-heated to a temperature on the order of from about 150° F. to 170° F.

Prior to the exposure of sleeve 17 to the heating effect of heating elements 51, 52 and 53, a disc-shaped element of thermoplastic material 71, from which bottom element 16 of the finished cup is to be formed, is brought into position against the bottom of mandrel 41 in coaxial relationship to sleeve 17. Element 71 is retained in such position during the heating step by vacuum applied thereagainst through a circumferential series of ports 44 which are in fluid communication with vacuum line passages 45 and 46 extending through a central spindle portion 47 of mandrel 41 and, in turn, communicating with a vacuum source, not shown, external to the mandrel. The use of a pair of such vacuum line passages, 45 and 46, makes it possible to maintain a vacuum in the annular space defined by the outer surface 41a of mandrel 41 and the central spindle 47 thereof. While such vacuum is not utilized in the illustrated embodiment of the invention, it can be utilized to advantage by providing vacuum ports through the surface 41a to help in the forming of sharp corners in an upper portion of the finished cup, as in the case of a cup having a stacking rim in an upper portion thereof or a cup formed from very thin and/or very low density material and thereby requiring a circumferentially extending stiffening rib near the upper portion thereof.

Figure 8:
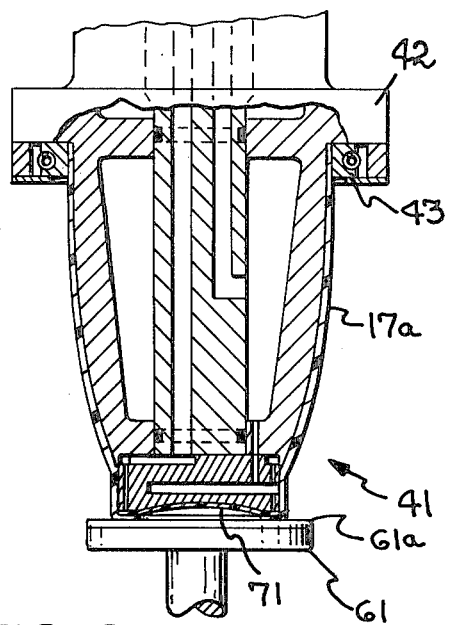

While the portion of sleeve 17 which overlies the side portion of the surface 41a of mandrel has shrunk into conformity therewith, as heretofore explained, the terminal portion of sleeve 17 which extends beyond the smaller end of the mandrel 41 will continue to shrink to form an annular, generally planar portion 17b which is integral with, and extends inwardly from the smaller end of portion 17a, and which overlaps the marginal portion of element 71 in a continuous, circumferential pattern. In the meanwhile, the interior portion of element 71 will permanently shape itself to conform to the concave curvature of the bottom of mandrel 41 by the effect of the heat and vacuum forces to which it is exposed, some vacuum naturally bleeding from ports 44 into the region above the interior portion of element 71. After the shrinking operation, the mandrel 41 with the shrunken sleeve 17 and the shaped bottom element 71 thereon is removed from exposure to heating elements 51, 52 and 53 and, as is shown in FIG. 8, a heated sealing tool 61, with a non-stick contact surface layer 61a such as a woven glass fabric, for example, of the type sold under the designation Flour glass, which is impregnated with Teflon resin or other non-stick material, is brought into pressing contact therewith to form a continuous, circumferentially extending, liquid-tight heat seal between portion 17b of sleeve 17 and the underlying marginal portion of element 71.

After the seal has been effected between portion 17b of sleeve 17 and the underlying portion of element 71, as has been described, the shrunken sleeve is stripped from the mandrel and is further processed in a conventional manner, for example, by rolling the rim 15 therein by means of conventional rim forming devices, by inspecting finished cups and by collecting and packaging a multiplicity of like cups in nested relationship with one another.

Figure 9:
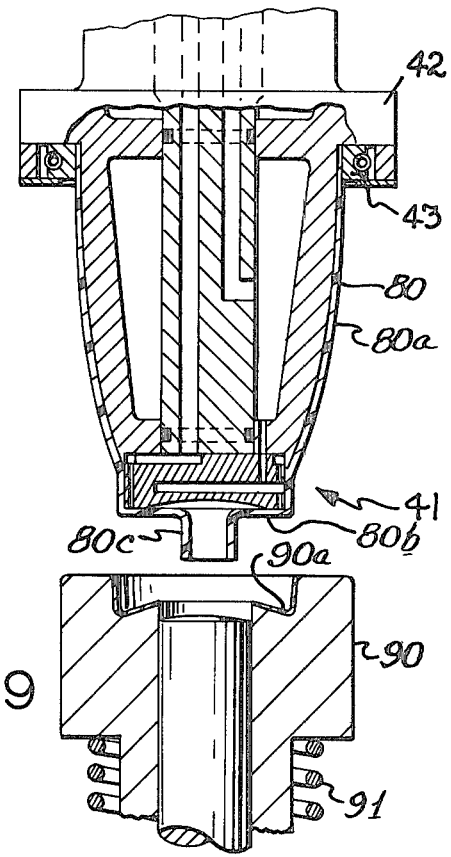
FIGS. 9 and 10 are schematic views illustrating sequential steps in the fabricating of a one-piece container.
Figure 10:
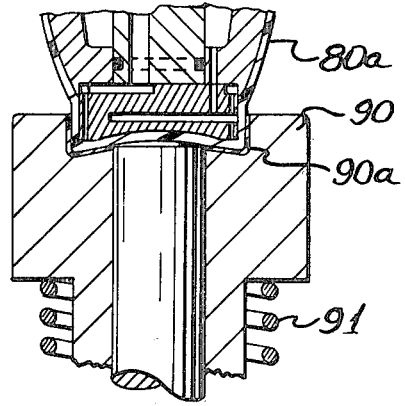

A cup of the type shown in FIGS. 1 and 2 may also be formed of one-piece construction, as well as of two-piece construction as heretofore described. Such a cup may be constructed, as is shown in FIGS. 9 and 10, from a sleeve 80 which is the same as sleeve 17 except that it is longer and has a relatively long portion adapted to extend beyond the smaller end of the forming mandrel, which may be considered to be the forming mandrel depicted in FIGS. 6–8. In such a case the starting sleeve from which the cup is to be formed is of sufficient length to have a substantial portion which extends beyond the smaller end of the mandrel 41 when the upper edge of such sleeve is in its aligned position with the upper portion of the forming surface of the mandrel. Upon the heat-shrinking of such a sleeve, as is shown in FIG. 9, it will form a member with a sidewall portion 80a, a generally planar annular portion 80b integral with portion 80a and extending radially inwardly from the lowermost edge thereof, and a relatively small tubulation 80c which extends longitudinally from the interior edge of the planar portion 80b and which is integral with sidewall portion 80a and annular portion 80b. The bottom of a cup may be formed in the shrunken member 80, preferably while such member is still on the mandrel, by the application of heat and pressure to the bottom of such member to cause the tubulation 80c to collapse and fuse together with planar portion 80b. This may be done by means of a pressing and shaping tool 90 which has a contoured surface adapted to contact the bottom of the shrunken sleeve and to shape it to the desired final configuration. Tool 90 is normally in a non-contacting position relative to mandrel 41, as is shown in FIG. 9, and it may be urged from such position into the sealing and pressing position depicted in FIG. 10 by the action of a spring 91. As the shrunken sleeve 80 on mandrel 41 may not be at a sufficiently high temperature at the time that tool 90 is brought into contact therewith to permit the sealing and pressing operation to be performed without additional heat, tool 90 may be considered to be heated by means, not shown, and to have its contact surface covered with a material 90a of the type used in regard to the contact surface 61a of the tool 61 of FIG. 8, as heretofore described. In case that the bottom sealing step in the manufacture of either the two-piece cup, as is shown in FIG. 8, or of the one-piece cup, as is shown in FIGS. 9 and 10, is done while the shrunken sleeve elements are at a sufficiently high temperature to obviate the need for additional means to heat the applicable sealing tool, an unheated sealing tool may be used, in which case it will normally be unnecessary to coat the contact surfaces of the sealing tools with the special non-stick material of surfaces 61a or 90a, as the case may be.

In general, it is recommended, for good stacking characteristics, that the sidewall taper of cups or other nestable container constructed in accordance with the present invention increase from a taper of the order of 5°–7° at the top thereof to a taper of the order of at least 15° at the bottom thereof. To obtain a good balance between performance and cost, for a cup of the order of size of a single serving of coffee or other hot beverage and based on current economic conditions, a starting or parent sheet of expanded polystyrene of a thickness of the order of 20 to 30 mils, of a density of the order of 10 to 18 pounds per cubic foot, and with an orientation in the longer or machine direction of the order of 75% and an orientation in the shorter or cross direction of the order of 15% is preferred, with sheets of a density of the order of 10 pounds per cubic foot and a thickness of the order of 25 mils (0.025 in) being highly satisfactory for the fabrication of single serving hot drink cups. However, while heat-shrinkable, expanded polystyrene is currently the preferred material for the fabrication of insulated cups and other nestable containers according to the present invention, such preference is based mainly on the cost of polystyrene relative to other thermoplastic resins. Such cost relationships could change with the passage of time, and it is therefore to be noted that other heat-shrinkable, expanded thermoplastic materials can, from a technical point of view, be employed in the practice of the invention, including such materials as polypropylene, polyethelyne and polyvinyl chloride. It is also to be noted that cups constructed in accordance with the present invention can be used as cold drink cups, where the insulating properties would not be as important, but would still be of value in preventing moisture from condensing on the outer surfaces. In the case of cups or other containers designed for holding cold drinks or for other fluent products at ambient temperature, the use of an expanded thermoplastic material would offer potential benefits, in relation to non-expanded materials, chiefly in reduced material costs.

While the invention has been described with respect to a nestable container which is circular in cross section at all elevations, it is to be noted that other configurations can be provided to suit the wishes of the designer. For example, a nestable container which has the cross section of a round-cornered square at all elevations can be provided, and a nestable container which has a circular cross section at the top gradually merging into the cross section of a round-cornered square at the bottom can be provided. Also, where close nesting is not required, an attractive nestable container with a sidewall having a reverse curvature, similar to the popular "Coke" tumbler, can be provided. Containers which are nonsymmetrical can also be provided.

It is also to be noted that the present invention can be practiced with non-expanded, heat-shrinkable thermoplastic materials in cases where the nestable cups or other containers do not require thermal insulating characteristics. Such containers would still have advantages over containers formed from such materials by vacuum forming or other sheet drawing techniques, in regard to the ease and relatively low cost with which the sidewall thereof could be decorated. Also, by virtue of the mode of manufacture thereof, such containers, being fabricated from rectangular blanks, would involve a considerably lower amount of scrap to be reground and recycled, and would inherently avoid the problem of excessive thinning in the sidewall region near the bottom which is characteristic of such containers when formed by any such popular sheet drawing technique and which, in regard to relatively tall, narrow containers, can lead to a significant reduction in the strength in the bottom regions of the sidewalls of such containers.

It is thought that the container of the present invention may be better understood from the following example, which is not to be construed as limiting the scope of the invention in any way.

EXAMPLE

The sidewalls of two-piece cups of the outline of that shown in FIG. 1 were constructed from preprinted rectangular blanks of 10 pounds per cubic foot density polystyrene, 9⅜ in. long by 4 in. wide by 25 mil (0.025 in.) thick, such blank having 75% orientation in the longer or machine direction and 15% orientation in the shorter or cross direction. The bottom elements were fabricated from polystyrene sheeting of the same specifications. Each finished cup had an overall height of 3.448 in., and I.D. at the rim of 2.920 in. and I.D. inside of the stacking shoulder of 1.892 in., a wall thickness, at the rim, of 30 mils, a wall thickness, immediately above the stacking shoulder, in excess of 40 mils, a curved sidewall curving along the arc of a circle of a radius of 12⅝ in. from a taper of 5°30' at the rim, and an O.D. over the rim of 3.155 inches. The stacking distance or height between the bottoms of like cups in a nested relationship was 0.390 inch. Each such cup had a volumetric capacity to overflowing of 9 fluid ounces and such cups were found to be very well suited, in rigidity, liquid impermeability and insulating properties for hot beverages such as coffee. Cups of similar design have also been satisfactorily constructed for expanded polystyrene sheets of the following thicknesses and densities: (1) 18 pounds per cubic foot and 25 mil, (2) 10 pounds per cubic foot and 30 mil, (3) 15 pounds per cubic foot and 20 mil, and (4) 18 pounds per cubic foot and 25 mil.

But for some differential post-expansion of the foam sheet which is caused by differential application of heat thereto which will be discussed hereafter, all regions of the cup sidewall were heated generally uniformly at the same temperature and the density of the cup sidewall remained relatively uniform throughout. As a result, it could be fairly said that the product of sidewall circumference at any elevation and thickness at that elevation remained relatively constant through a major portion of the cup.

Referring now to FIGS. 11–14, which illustrate the previously described apparatus for making the two-piece cups in more detail, the reference numbers to certain elements which have been previously described have been increased by 100 to facilitate reference back to the previous descriptive matter, and unless otherwise indicated, the elements correspond to the elements described above.

Figure 11:
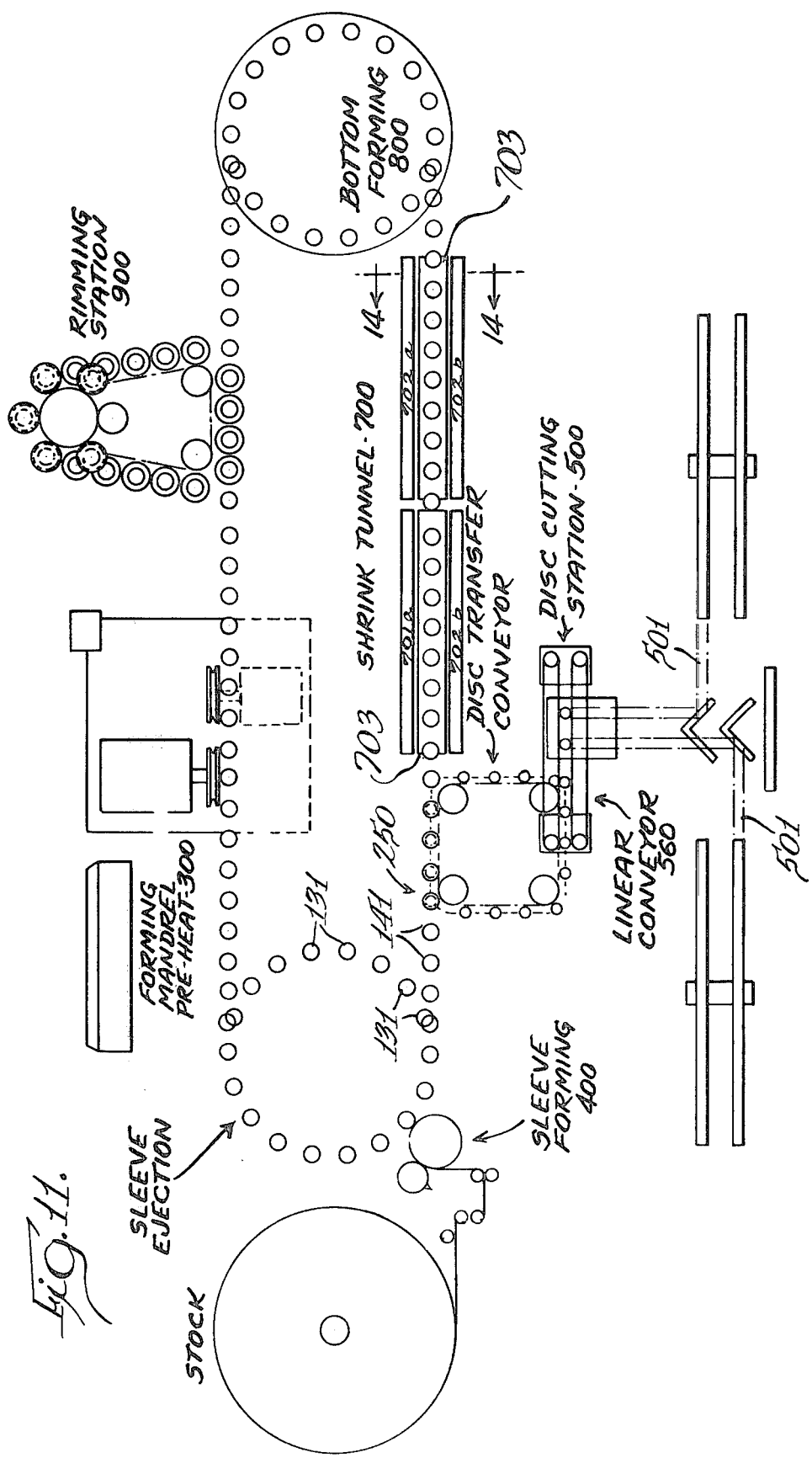
FIG. 11 is a schematic representation of an exemplary form of apparatus in accordance with the present invention.
Figure 12:
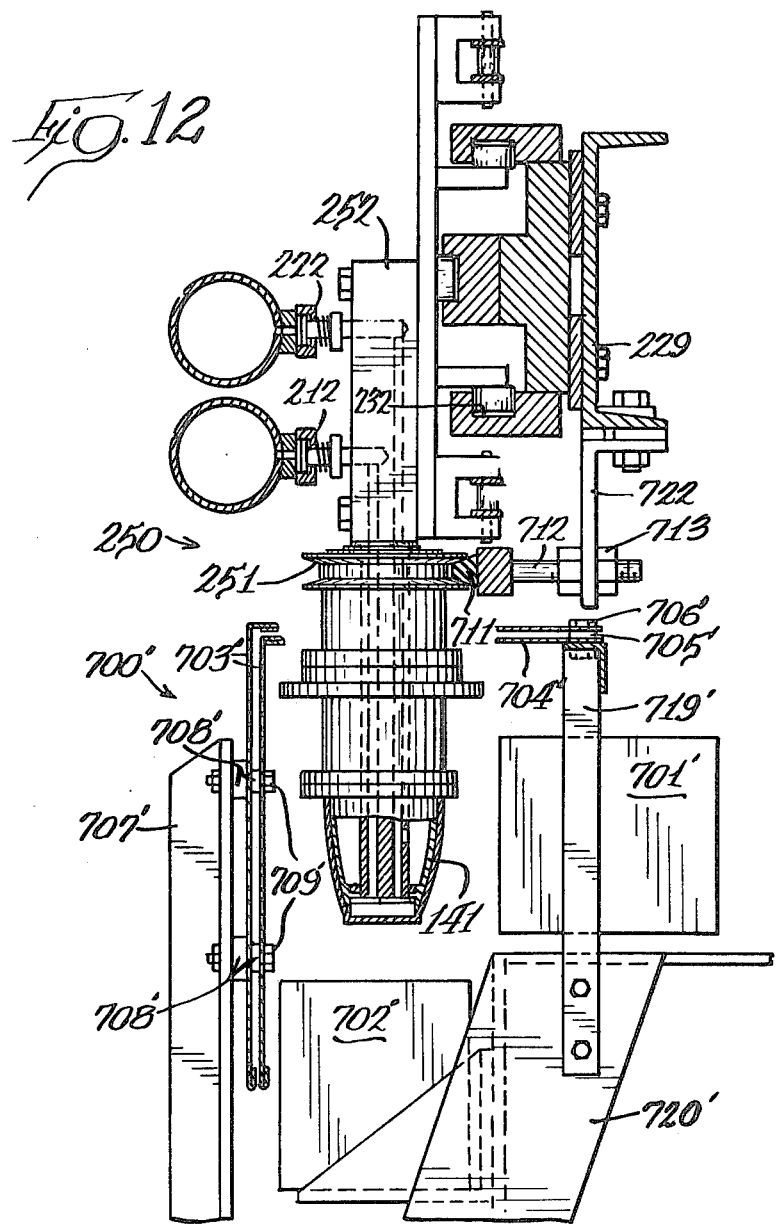
FIG. 12 is a cross-sectional view of an alternate shrink tunnel embodiment.
Figure 13:
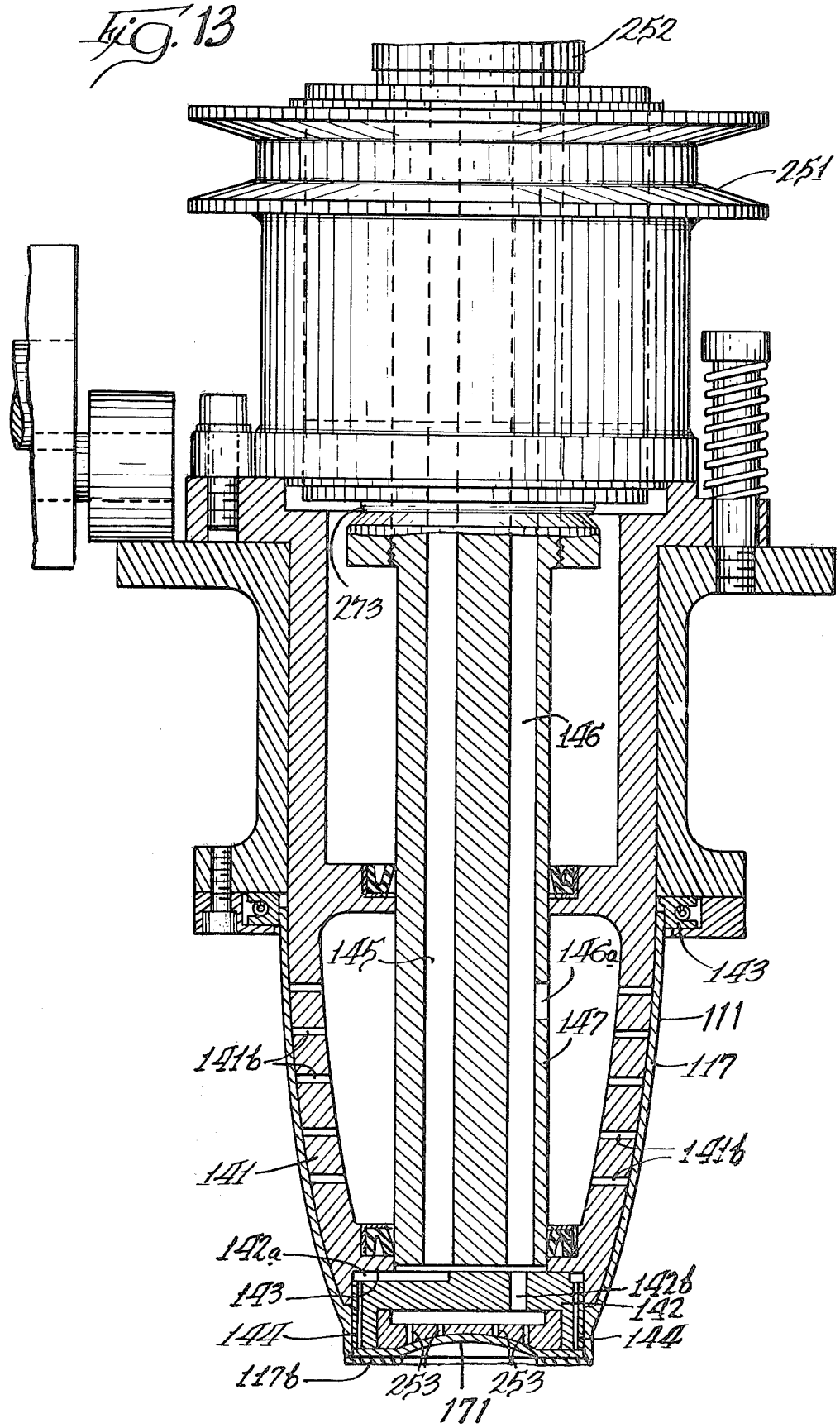
FIG. 13 is an enlarged cross-sectional view of a forming mandrel.

FIG. 11 is a schematic plan view of a preferred embodiment of the apparatus of the present invention in its entirety and the apparatus may be considered to be comprised of a plurality of separate working stations, or subassemblies, which are hereinafter discussed individually. The separate working stations, or subassemblies are representative of various steps that are performed in the process of the present invention, and are discussed essentially in the sequence in which they are performed. With specific reference to FIG. 11, and beginning approximately at the "12 O'Clock" position, a main conveyor 250 having a plurality of spaced mandrels thereon moves in a counterclockwise direction to a mandrel preheat station 300, a sleeve forming station 400 ("9 O'Clock" position) which includes a web handling and feed subassembly and a sleeve transfer subassembly, a bottom disc cutting station 500 ("6 O'Clock" position) which includes an initial bottom disc conveyor and a final bottom disc conveyor which transfers the discs to the main conveyor, a shrink tunnel 700, a bottom forming station 800 ("3 O'Clock" position) and a rim forming station 900. While the various mechanisms and process steps are hereinafter discussed individually, it should be understood that the various steps and operations are performed in timed sequence in proper interrelationship with respect to one another, so that the various mechanisms cooperate in the form of a true combination.

The main conveyor 250, which transports the cup forming mandrels 141 through the above-mentioned series of operational stations, moves continuously along a closed path in the form of a flattened ellipse, although it should be understood that paths having other shapes, such as circular, are within the contemplation of the invention. A blank of thermoplastic material of predetermined length is fed onto sleeve forming mandrels 131, which are turret mounted beneath the main conveyor 250 at station 400. The blanks are then sealed along their end portions to form a sleeve 117, which is telescoped upwardly by a stripper sleeve to the main conveyor mounted mandrels 141 which have been preheated prior to reception of the sleeve 117. The main mandrel conveyor 250 then transports the sleeves 117 to the disc transfer conveyor 600 to receive the bottom discs 171.

The bottom discs 171 are cut two at a time from two webs of stock 501 by dual die cutters at the bottom disc cutting station 500. The cut discs 171 are then serially transferred by a linear conveyor 560 to the disc transfer conveyor 600 which places the individual discs 171 on the bottom of the forming mandrel 141.

After receiving the bottom disc 171, the cup forming mandrels 141 are conveyed through the shrink oven or tunnel 700 wherein the sleeve blank 117 is shrunk to the contour of the forming mandrel 141, with the end portion 117b of the sleeve overlapping the bottom closure disc that has been previously placed on the mandrels. After emerging from the shrink tunnel, the forming mandrels move to the bottom forming station 800 where a sealing die forms a fluid tight seal between the bottom portion 117b of the shrunken sleeve and the disc. The formed cup 111 is then conveyed to the rimming station 900 where the cup is removed from the forming mandrel 141 and deposited in a cup die. The cup die is then conveyed to a rimming mechanism which is reciprocated into engagement with the cup die to form the circumferential bead rim, thus completing formation of the cup. The finished cups are then removed from the rimming station conveyor, and the empty cup die receives a formed cup 111 which is to be rimmed. After having deposited the partially formed cups in the rimming station cup die, the main forming mandrels are conveyed to the mandrel preheat station 300 and the entire operation is repeated. Fittings 212 and 222 are connected, respectively, to vertical passages 145 and 146 (FIG. 13) that extend the entire length of the spindle portion 147 of support member 252. A lateral port 146a (FIG. 13) establishes communication between passage 146 and the space between spindle 147 and the contoured sidewall at the lower end of spindle 141. A plurality of passages 141b are provided in the mandrel sidewall for applying vacuum to the sleeve 117, in the shrink tunnel as will hereinafter appear.

A plug 142 is seated within a downwardly opening recess 143 in the lower end of mandrel 141 and plug 142 includes a passage 142a establishing communication between passage 145 and a plurality of fine vertical passages 144 spaced circumferentially around the plug adjacent the outer diameter thereof. Plug 142 includes a further passage 142b that establishes communication between passage 146 and a plurality of spaced vertical passages 253 in the upwardly dished central portion of plug 142. Passages 253 are somewhat larger than passages 144 to assist in shaping the bottom contour of the cup, as will hereinafter appear. The vacuum drawn through passages 144 applies retentive force to the edges of disc 171, and positively holds the disc on mandrel 141.

Shrink Tunnel

Figure 14:
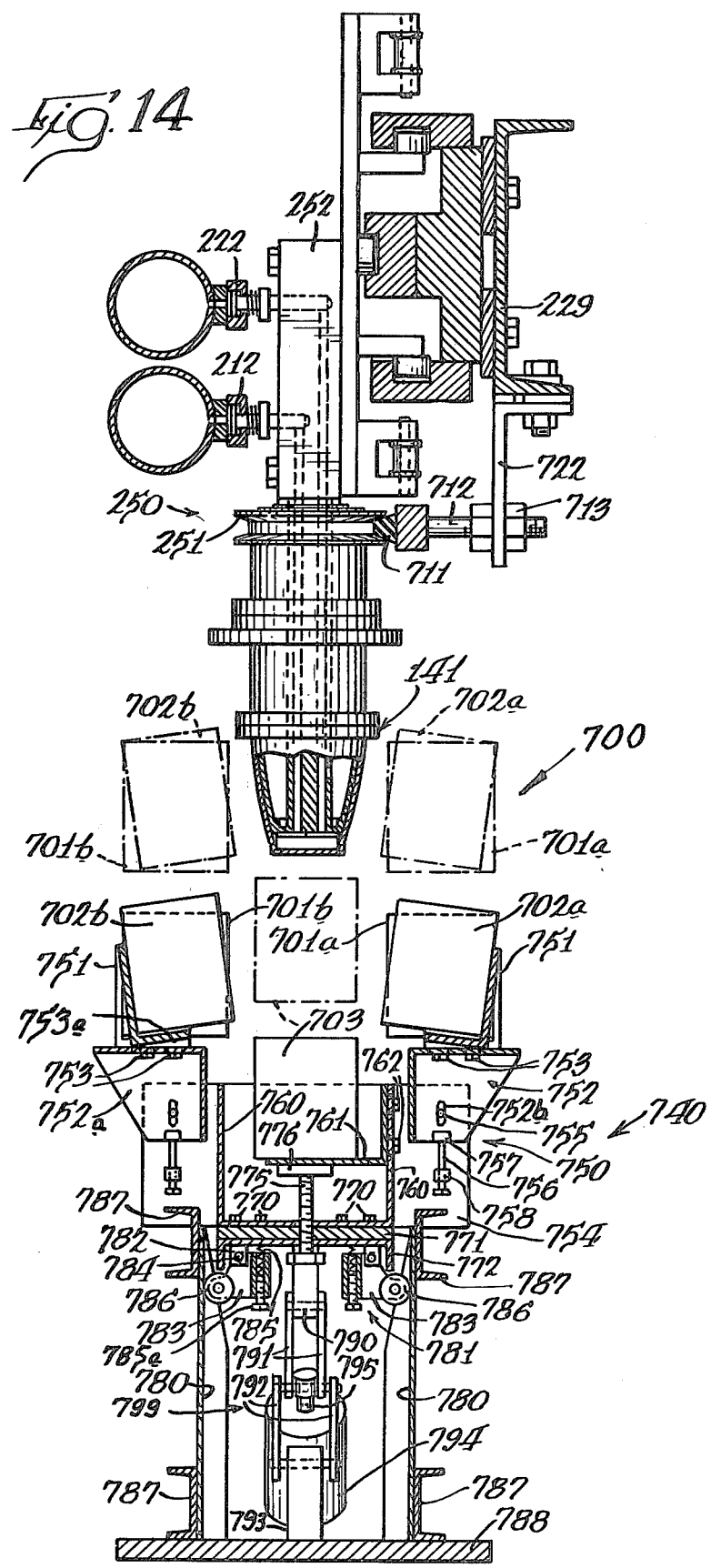
FIG. 14 is a cross-sectional view of the shrink tunnel taken generally along plane 30—30 of FIG. 11.
Figure 15:
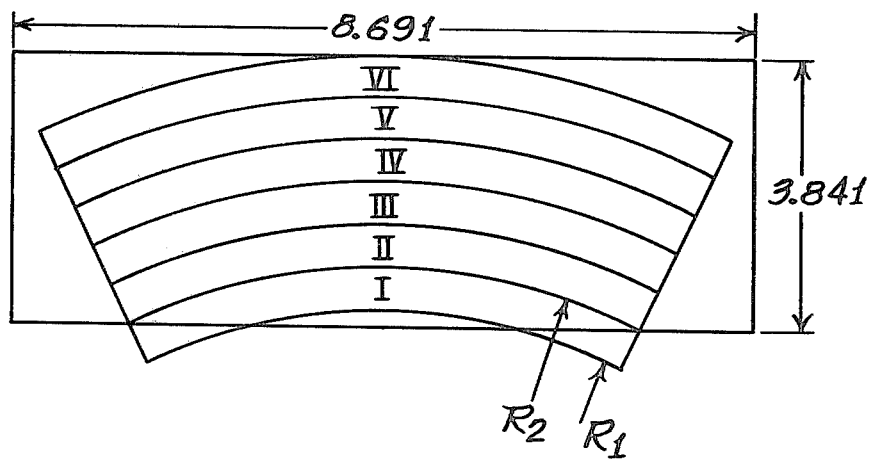
FIG. 15 is a plan view showing a layout of a sidewall blank prior to and after shrinkage.

Immediately upon receiving the bottom disc 171, the forming mandrels 141 are conveyed through a shrink-tunnel or oven wherein the thermoplastic material is caused to shrink to the contour of the surface of the forming mandrel 141. Referring to FIGS. 11 and 14, the shrink-tunnel 700 includes six longitudinally extending infra-red heaters which are disposed, respectively, along the inside (701a and 702a), outside (701b and 702b), and beneath (703) the path of conveyor 250.

Side heaters 701a and 701b are parallel to the side of the path of the main conveyor 250 at the first half of the shrink tunnel, with the mandrel facing surfaces of the heaters being parallel to one another, to uniformly heat the generally cylindrically shaped sleeve 117 and initially heat the sleeves as they move into the shrink tunnel. As sleeve 117 is heated by heaters 701a and 701b, the lower end portion of the sleeve moves away from each of the heaters inwardly toward the small contoured end of the mandrel 141 so that the upper portion of the sleeve would be heated to a greater extent than the lower portion. As noted above, the taper of the sleeve ranges from 5°-7° at the top thereof and increases to a taper on the order of at least 15° at the bottom. To accommodate for this difference in distance and provide for generally uniform heating, heaters 702a and 702b are canted to assume a position substantially parallel to the mean contour of the forming mandrel 141 so that the distance between the heating elements and sleeve 117 is substantially equal along the second half of the shrink tunnel.

In one shrink tunnel embodiment, good results have been achieved by canting heaters 702a and 702b at an angle of $7\frac{1}{2}°$ from the vertical plane. In this embodiment, the heating elements of each canted heater were spaced a perpendicular distance from the stacking shoulder contour on the mandrel 141 substantially equal to the perpendicular spacing of the upstream heaters from the path of conveyor 250. In this embodiment, the upstream bottom heaters were spaced approximately 2 inches lower than the downstream bottom heaters so that the lower portion of the sleeve is not heated sufficiently in the first half of the shrink tunnel to produce premature curling or folding of the sleeve.

The heaters are mounted on an elevator assembly 740 which raises the heaters from a lowered position to an elevated operating position (shown in phantom in FIG. 14) around conveyor path 250 by means of two air cylinders 794 (only one of which is shown in FIG. 14). The heaters are thus adjustable to allow for service of the mandrels in the shrink oven and to provide for start-up and shut-down of the machine.

The heaters are adjustably mounted by two independent but interconnected mounting assemblies 750. Each assembly 750 includes two L-shaped brackets 751 which mount the ends of each of the side heaters to corresponding sets of inverted L-shaped adjustment brackets 752, by bolts 753. Side heaters 701a, 701b, 702a and 702b are secured to their respective brackets 751, as by welding. Brackets 752 are provided with horizontal adjustment slots through which bolts 753 pass so that each side heater may be independently adjusted inwardly and outwardly relative to the mandrel path. Spacers 753a, such as a shim material, may be positioned between the abutting horizontal surfaces of brackets 751 and 752 to provide the desired cant to side heaters 702a and 702b.

Each vertical adjustment bracket 752 has a side plate 752a in abutting relationship to a mounting plate 754, and parallel vertical slots 752b inside plates 752a are each impaled by a bolt 755 to guide brackets 752 for vertical movement relative to plates 754. Brackets 752 are moved by vertical adjustment studs 756, the upper ends of which bear against the lower surface of blocks 757 fixed to the lower portion of side plates 752a. The midportion of each stud 756 is threaded through a block 758 on the vertical surface of plate 754 so that, as each stud 756 is turned, the elevation of heater end thereabove is adjusted.

A longitudinally extending U-shaped channel 760 is centrally located between the brackets 752 of each pair of side heaters, and each channel 760 carries a bottom heater 703. The bottom heaters 703 are located centrally between the upwardly extending legs of channels 760, and to this end, L-shaped adjustment brackets 761 are secured to the ends of channels 760 by bolts 762 that extend through vertical adjustment slots in the vertical portion of bracket 761. The base of each channel 760 is secured to mounting pads 771 at each end by bolts 770, and the mounting pads are in turn fixedly mounted on an inverted U-shaped channel member 772 which extends the full length of the shrink tunnel to provide for conjoint movement of the assemblies 750, as discussed below. Vertical studs 775 are provided for independently adjusting the elevation of bottom heaters 703, and studs 775 are threaded through pads 771 and pass through clearance holes in channels 772 and 760 to bear against adjustment blocks 776 located on the bottom surface of bracket 761 to provide means for adjusting the end of the bottom heaters independently of each other and the side heaters.

The mounting assemblies 750 are positioned between and bear against parallel, vertically extending frame uprights 780 through lever mounted roller assemblies 781 which are provided at each side of opposite ends of channel member 772. Each roller assembly includes a pivot block 782 fixedly attached, as by welding, to the bottom surface of the web of channel 772, and a lever 783, pivotally attached to one of blocks 782 by pin 784. Each lever member carries a lateral roller 786 which bears against an upright 780 under the influence of loading spring 785 disposed upwardly from each lever member to contact the lower surface of the web of channel 772. Each loading spring is adjustable by bolt 785a so that the moment and bearing force generated in each roller against upright 780 may be adjusted. The frame uprights are supported by longitudinal channels 787 at the base and top, and the bottom flanges of the base channels are mounted on floor pads 788.

The channel 772 is supported by an air cylinder activated linkage system 799 at each end of the shrink tunnel, and each system includes a connection link 790 mounted to the lower surface of the web of channel 772, a first pair of parallel links 791 pivotally connected at one end to link 790, a second pair of parallel links 792 pivotally attached outboard the ends of links 791, a base link 793 mounted to floor pad 788 and pivotally attached at the other end to links 792. Each linkage system is operated by an air cylinder 794 which is pivotally mounted (not shown) at an angle with respect to base 788. The piston rod 795 of each cylinder is pivotally attached to the linkage system inboard at the joint of links 791 and 792, so that, as the rod 795 is moved outwardly of the eylinder, the linkage system will raise the heaters to the operative position shown in phantom line in FIG. 14.

Shrink tunnel 700 is provided with means for rotating the forming mandrels 141 to assure even distribution of heating. To this end, the edge portion of a horizontal rail 711 engages within recess 251 of the forming mandrel, so that as the mandrel is conveyed through the shrink tunnel the mandrel will rotate about its spindle 147. Rail 711 is preferably formed of a resilient material so that contact is maintained with recess 251. Rail 711 is suspended below frame member 229 from inverted L-shaped brackets 722 by studs 712 and nuts 713, and preferably is coextensive in length with the shrink tunnel.

As the sleeve 117 is being shrunk in the tunnel, the vacuum that is supplied along the contoured surface of the mandrel cooperates with the shrinkage attributable to the heat to cause the sleeve 117 to closely conform to the external contour of the mandrel. As the sleeve 117 shrinks, the lower portion thereof moves inwardly into overlapping relationship with the peripheral edge of the bottom disc 171, while the central portion of the disc is drawn upwardly by the combined action of the heat and the vacuum applied through passages 253.

With the heaters positioned as described above, it has been found possible to produce a temperature differential within the shrink tunnel which enables a unique and highly advantageous container to be produced. Specifically, the combination of the bottom heater and the canted side heaters in the downstream portion of the shrink tunnel, together with the absence of a heater at the upper portion of the shrink tunnel, causes a higher temperature to be present at the upper portion of the shrink tunnel than at the lower portion thereof. As will be explained in more detail hereinafter, this enables a container to be produced which has a sidewall which varies both in density and thickness, the thinnest and most dense region being at the upper end of the sidewall and the thickest and least dense region being at the lower end of the sidewall. Such a container has enhanced strength and stability, as compared to prior art containers, and in fact, enables containers of surprising strength to be formed from thin materials which would ordinarily be expected to produce a structurally unsound container.

For purposes of illustration, the sidewall blank for a 6 oz. hot beverage container is shown laid out flat prior to shrinkage in FIG. 38, and superimposed thereon is a flat layout of a sidewall after it has been shrunk on a mandrel of the type described above. Of course, the external surface of the mandrel, if laid out flat, would assume the same configuration of the shrunken container sidewall. The sidewall was formed of 25 mil thick expanded polystyrene of the type set forth above, and was shrunk by moving it through a shrink tunnel as shown in FIG. 14 at a rate of 150 feet per minute. In the shrink tunnel the temperature varied from around 1,350° F. in the region adjacent the lower end of the sidewall to around 1,250° F. in the region adjacent the upper end of the sidewall.

The shrunken container sidewall was divided into six zones of equal volume, and the geometric details of the sidewall configuration are set forth herebelow in Table 1.

TABLE 1

|  | Original Rectangle Blank 6 Oz.LTC | Frustrum Cone Mandrel | Zone #I | Zone #II | Zone #III | Zone #IV | Zone #V | Zone #VI |
|---|---|---|---|---|---|---|---|---|
| AREA In². | 33.13 | 27.82 | 3.849 | 4.164 | 4.478 | 4.792 | 5.107 | 5.442 |
| Radius $R_1$ In. |  | 7.184 | 7.184 | 7.824 | 8.464 | 9.104 | 9.744 | 10.384 |
| Radius $R_2$ In. |  | 11.024 | 7.824 | 8.464 | 9.104 | 9.744 | 10.384 | 11.024 |
| Volume In.³ | 0.828 | 0.828 | 0.138 | 0.138 | 0.138 | 0.138 | 0.138 | 0.138 |
| Blank-thickness mils | 25.0 |  | 35.8 | 33.1 | 30.8 | 28.8 | 27.0 | 25.5 |
| Thickness Variation mils |  |  | 10.8 | 8.1 | 5.8 | 3.8 | 2.0 | 0.5 |

It should be noted that the average sidewall thickness varied from 25.5 mils in Zone VI to 35.8 mils in Zone I, and that the sidewall thickness increased continuously and progressively from the upper end to the lower end. The increase in sidewall thickness is caused by not only the geometric area reduction when the cylindrical sleeve shrinks to the configuration of the mandrel, but also by post expansion of the foam wherein heat within the shrink tunnel drives off residual blowing agent in the foam.

Figure 16:
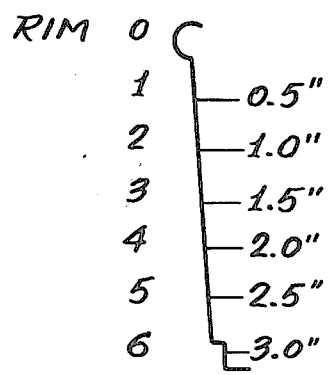
FIG. 16 is a cross-sectional view through a container sidewall which varies in thickness and density.

The sidewall of a six oz. container of the type described above is shown in cross-section in FIG. 16, and six positions are identified progressing in ½ inch intervals from the rim of the container to the base thereof. The details regarding the thickness and density variations for two such containers are set forth herebelow in Table 2.

TABLE 2

| Position | Distance from rim in. | Cup Sidewall Thickness mil. | Thickness Variation mil. | Increased Thickness due to Shrinkage mil. | Increased Thickness Due To Post Expansion mil. | Density p.c.f. |
|---|---|---|---|---|---|---|
| Sample #1 rim | 0 | 25.0 | 0.0 | 0.0 | 0.0 | 11.20 |

TABLE 2-continued

| Position | Distance from rim in. | Cup Sidewall Thickness mil. | Thickness Variation mil. | Increased Thickness due to Shrinkage mil. | Increased Thickness Due To Post Expansion mil. | Density p.c.f. |
|---|---|---|---|---|---|---|
| 1 | 0.5 | 36.0 | 11.0 | 0.5 | 10.5 | 8.00 |
| 2 | 1.0 | 39.0 | 14.0 | 2.0 | 12.0 | 7.56 |
| 3 | 1.5 | 43.0 | 18.0 | 3.8 | 14.2 | 7.14 |
| 4 | 2.0 | 45.0 | 20.0 | 5.8 | 14.2 | 7.14 |
| 5 | 2.5 | 47.5 | 22.5 | 8.1 | 14.4 | 7.11 |
| 6 | 3.0 | 50.5 | 25.5 | 10.8 | 14.7 | 7.03 |
| Sample #2 rim | 0 | 25.0 | 0.0 | 0.0 | 0.0 | 11.50 |
| 1 | 0.5 | 32.0 | 7.0 | 0.5 | 6.5 | 9.13 |
| 2 | 1.0 | 35.0 | 10.0 | 2.0 | 8.0 | 8.71 |
| 3 | 1.5 | 39.0 | 14.0 | 3.8 | 10.2 | 8.17 |
| 4 | 2.0 | 41.0 | 16.0 | 5.8 | 10.2 | 8.17 |
| 5 | 2.5 | 44.0 | 19.0 | 8.1 | 10.9 | 8.00 |
| 6 | 3.0 | 47.0 | 22.0 | 10.8 | 11.2 | 7.90 |

It will be noted that in Sample 1, the sidewall thickness increased continuously and progressively from a minimum thickness of 25 mils adjacent the rim of the container to a maximum thickness of 50.5 mils adjacent the base of the container, while the density of the sidewall varied continuously and progressively from a maximum of 11.20 lbs/cu.ft. adjacent the rim of the container to a minimum of 7.03 lbs/cu.ft. adjacent the base of the container. A similar result is shown in Sample 2 where the sidewall thickness increased from 25 to 47 mils in progressing from the rim to the base, while the sidewall density decreased from 11.50 to 7.90 in progressing from the rim to the base.

By appropriate selection of processing conditions, i.e., the amount of residual blowing agent in the foam, the temperature conditions within the shrink tunnel, and the time of exposure of the material to heat, the degree of thickness and density variations can be controlled. Desirably, the thickness of the lower end of the sidewall may be increased from about 50 percent to about 125 percent as compared to the thickness of the starting material, while the density at the lower end of the sidewall is decreased from about 25 percent to about 50 percent. It will be noted from Table 2 that a significant amount (greater than 50 percent) of the increase in sidewall thickness is due to post expansion of the foam.

Alternately, the shrink tunnel may also be formed with two sets of heaters disposed to one side and beneath the path of the conveyor 250. Referring to FIG. 24, the shrink tunnel 700' includes longitudinally extending infrared heaters 701' and 702' which are disposed, respectively, along one side and beneath the path of the conveyor 250. Reflector plates 703' located opposite heater 701' and reflector plates 704' located above heater 701' are designed to contain and reflect the infrared heating rays emitted from the heaters. Reflector plates 704' are mounted to a frame member 720' by insulators 705' which are secured to frame brackets 719' by bolts 706'. Reflector plates 703' are mounted to vertical support member 707' by insulators 708' and bolts 709'. The apparatus for rotating the mandrels 141 and supplying vacuum thereto are the same as shown in FIG. 14 and are correspondingly numbered.

The invention, and operative embodiments thereof, have been described above in terms sufficiently full, clear, concise and exact as to enable any person skilled in the art to make and use the same. It is to be understood, however, that it is within our contemplation that certain modifications of the above-described mode of practicing the invention can be made by a skilled artisan without departing from the scope of the invention and it is, therefore, desired to limit the invention only in accordance with the appended claims.

We claim:

1. A nestable cup-like container comprising, in combination: a unitary sidewall formed from a double-ended sheet of an expanded heat-shrinkable thermoplastic material, and having an inner surface adapted to contact a liquid product to be contained in said container, the ends of said sheet being joined to one another to form a liquid-tight seam extending from the top to the bottom of said container, said ends are of reduced thickness and increased density, said container having a mouth at its top which is defined by the upper portion of the sidewall, the sidewall continuously and progressively tapering inwardly and downwardly from the said open mouth for a major portion of the height of said container, the thickness of the sidewall continuously and progressively increasing over the said major portion from a lesser thickness at the top thereof to a greater thickness at the bottom thereof, as a result of heat shrinking said sheet the density of the sidewall continuously and progressively decreasing over the said major portion from a greater density at the top thereof to a lesser density at the bottom thereof; and a piece which is separate from said unitary sidewall and which is sealingly fused to an overlapping, laterally extending, inwardly folded, lowermost integral portion of the double-ended sheet from which the sidewall is formed, thereby closing the bottom of the container in a liquid-tight manner.

2. A container according to claim 1 wherein the uppermost portion of the double-ended blank from which the sidewall is formed is reversely folded into a relatively thin, tight bead which surrounds the mouth of the container.

3. A container according to claim 1 wherein said expanded heat-shrinkable thermoplastic material comprises polystyrene of an average density of the order of 5 to 18 pounds per cubic foot.

4. A container in accordance with claim 3 wherein the thickness of the sidewall of such container, at an elevation proximate to the upper open end thereof, is of the order of 20–30 mils.

5. A container according to claim 1 wherein the taper of the major portion of the sidewall increases from a minimum taper at an upper, thinner region of said major portion to a greater taper at a lower, thicker region thereof.

6. A container according to claim 5 wherein said taper is of the order of 5°–7° at the upper region of the major portion of the sidewall and is of the order of at least 15° at the lower region thereof.

7. A container according to claim 1 wherein the sidewall is provided with an inwardly extending shoulder at a location below said major portion against which shoulder the bottom portion of a substantially identical container is adapted to abut when said substantially identical container is inserted into said container in nested relationship to maintain a predetermined minimum spacing between said containers.

8. A container according to claim 1 in which the thickness at the bottom of the major portion of the sidewall is from about 50 percent to about 125 percent greater than the thickness at the top of the major portion of the sidewall.

9. A container according to claim 1 in which the density at the top of the major portion of the sidewall is from about 25 percent to about 50 percent greater than the density at the bottom of the major portion of the sidewall.

10. A container according to claim 1 in which the thickness at the bottom of the major portion of the sidewall is from about 50 percent to about 125 percent greater than the thickness at the top of the major portion of the sidewall, and wherein the density at the top of the major portion of the sidewall is from about 25 percent to about 50 percent greater than the density at the bottom of the major portion of the sidewall.

* * * * *